US008034282B2

(12) United States Patent
Loretta (10) Patent No.: US 8,034,282 B2
(45) Date of Patent: Oct. 11, 2011

(54) THERMAL ENERGY MACHINE WITH INTERCHANGEABLE COMPONENTS FOR PROCESSING DIFFERENT SIZED PARTS

(75) Inventor: Miles Edmond Loretta, Greenville, SC (US)

(73) Assignee: Kennametal Inc., Latrobe, PA (US)

( * ) Notice: Subject to any disclaimer, the term of this patent is extended or adjusted under 35 U.S.C. 154(b) by 526 days.

(21) Appl. No.: 12/205,538

(22) Filed: Sep. 5, 2008

(65) Prior Publication Data

US 2010/0059908 A1    Mar. 11, 2010

(51) Int. Cl.
*B23K 7/00* (2006.01)
(52) U.S. Cl. .............................. 266/50; 266/49; 266/48
(58) Field of Classification Search .................... 266/48, 266/49, 51
See application file for complete search history.

(56) References Cited

U.S. PATENT DOCUMENTS 3,992,138 A * 11/1976 Leisner ......................... 432/231
2002/0061237 A1    5/2002 Yamashita et al.
2003/0129034 A1    7/2003 Yamashita et al.

FOREIGN PATENT DOCUMENTS

KP    10-2006-0041387 A    11/2007

OTHER PUBLICATIONS

International Search Report and Written Opinion dated Jan. 29, 2010.

* cited by examiner

*Primary Examiner* — Scott Kastler
(74) *Attorney, Agent, or Firm* — Matthew W. Smith (57) ABSTRACT

A thermal energy machining ("TEM") machine is designed with interchangeable components for processing different sized parts within a single frame. The frame weldment includes a base, an upper mounting plate and intermediate mounting plates. In one embodiment, a TEM machine for processing short parts includes a ram cylinder directly secured to the base, a chamber spacer directly secured to the upper mounting plate and a thermal chamber directly secured to the chamber spacer. In another embodiment, a TEM machine for processing long parts includes a thermal chamber directly secured to the upper mounting plate, a ram spacer directly secured to the base, and a ram cylinder directly secured to the ram spacer.

17 Claims, 7 Drawing Sheets

THERMAL ENERGY MACHINE WITH INTERCHANGEABLE COMPONENTS FOR PROCESSING DIFFERENT SIZED PARTS

BACKGROUND OF THE INVENTION

The invention relates in general to a thermal energy machine ("TEM"), and in particular to a single station or a multiple station thermal energy machine with interchangeable components for processing different sized parts with a single frame weldment.

TEM was introduced in the late 1960's as an effective way to remove internal and external burrs and flashing from machined or molded metal and plastic parts. TEM is also known "gas detonation deburring," "thermal deburring," "combustion chamber treatment," and "rapid high energy removal of superfluous projections." The concept behind TEM is elegantly simple: instead of mechanically abrading off burrs and flashing, the burrs and flashing are simply burned away in a fraction of a second. This simple concept is applied in an exciting way: one or more metal or plastic parts requiring deburring or deflashing are sealed inside a combustion chamber and surrounded with a highly pressurized explosive gas mixture which is then ignited by an electric spark. The resulting explosion produces a thermal shock wave that literally burns away (oxidizes) the burrs and flashings from the parts while the relatively great thermal mass of the parts prevents the parts themselves from being damaged by the thermal shock wave. The explosive flame temperature can reach over 6,000° F. (3,316° C.). The explosion lasts only milliseconds and the entire load-to-load cycle time is on the order of half a minute.

Figure 7:
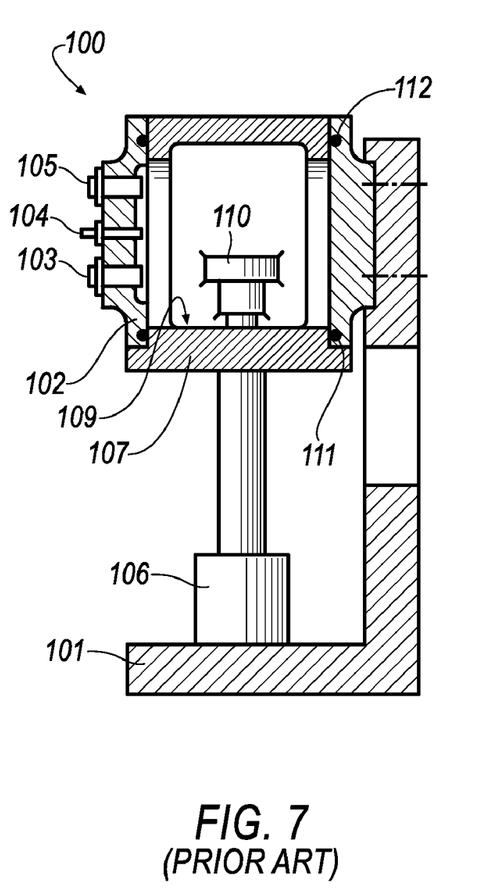
FIG. 7 is a cross-sectional view of a conventional TEM machine for thermal deburring of parts in the working position.
Figure 8:
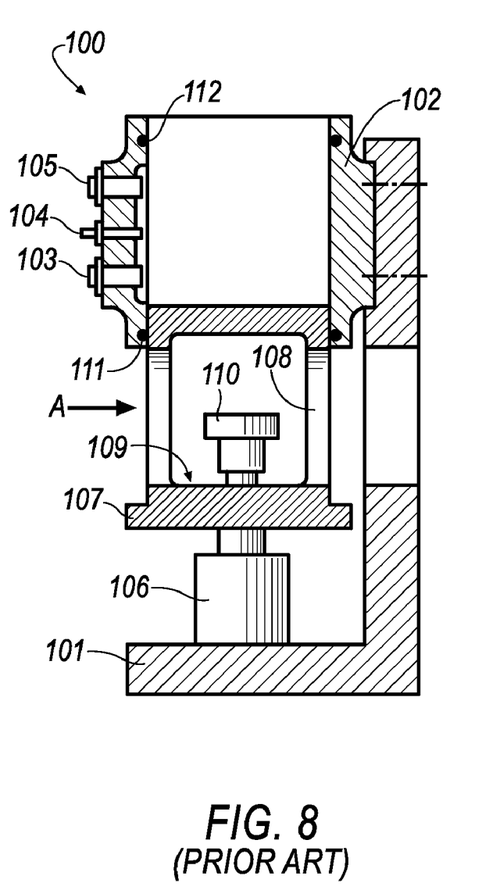
FIG. 8 is a cross-sectional view of the conventional TEM machine in the initial position.
Figure 9:
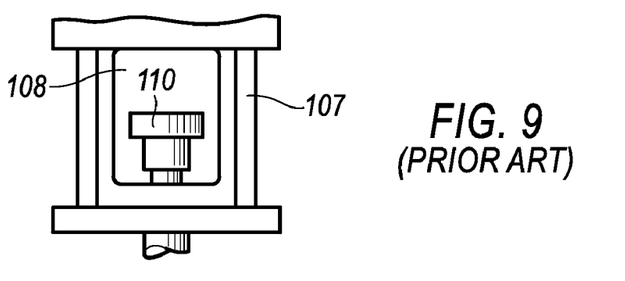
FIG. 9 is a view of the conventional TEM machine taken along arrow A in FIG. 8.

A conventional C-frame TEM machine 100 for thermal deburring of parts is shown in FIGS. 7, 8 and 9. The TEM machine comprises a stationary frame 101 in which is rigidly secured a working chamber 102 having an admission valve 103, a spark plug 104 and a discharge valve 105 incorporated in its wall. The chamber 102 is in the form of a cylinder open at both ends, the lower hole of the chamber 102 (as shown in the drawings) is a loading hole. The frame 101 also supports a pneumatic cylinder 106 having a movable member thereof carrying a bottom member 107, which is designed for closing and opening the chamber 102 and which comprises a hollow cylinder having end plates and openings 108 in the peripheral wall, the height and outside diameter of the cylinder being about equal to the height and inside diameter of the working chamber 102. The inner surface of the lower end plate of the bottom member 107 (as shown in the drawings) functions as a worktable 109 for supporting a part 110 being treated which are installed and removed through the openings 108. The bottom member 107 is mounted for movement along the axis of the chamber 102. An elastic sealing ring 111 is installed between the chamber 102 and bottom member 107 on the side of the loading hole of the chamber 102 and an auxiliary sealing ring 112 is provided on the side opposite to the loading hole. The sealing rings 111 and 112 may be made of any appropriate sealing materials, e.g. of rubber of PTFE.

In the initial position, the bottom member 107 (FIGS. 7, 8 and 9) is lowered as shown in FIG. 8. A part 110 that is to be treated (or a plurality of parts to be treated) is placed through the opening 108 onto the worktable 109. Then, the bottom member 107 supporting the part 110 is raised by the pneumatic cylinder 106 along the inner wall of the working chamber 102 to the upper position as shown in FIG. 7. The elastic sealing rings 111 and 112 will thus seal the interior space of the working chamber 102. After the chamber 102 has been sealed, a fuel mixture is admitted to its interior space through the openings 108 and admission valve 103, and the fuel mixture is ignited by the spark plug 104. As a result of a rapid temperature and pressure rise in the interior space of the working chamber 102, burs of the parts 110 being treated are burnt and/or fused owing to their large surface and relatively small mass.

After the discharge valve 105 is opened, combustion products are discharged from the interior space of the working chamber 102, and the bottom member 107 is lowered by the pneumatic cylinder 106 to take the initial position. After the part 110 being treated has been removed from the interior space of the working chamber 102 and a next part 110 has been placed in the worktable 109, the working cycle is repeated.

The conventional TEM machine described above has a number of drawbacks. Most importantly, the single size of the chamber and the single stroke length of the pneumatic cylinder limit the size and number of parts that can be placed in the chamber. In addition, the amount of the gas mixture that may be used in the TEM process for a part may become excessive, especially for a small part, which increases the overall operational costs of TEM machine. Therefore, it would be desirable to provide a TEM machine that has a selectively adjustable chamber size and pneumatic cylinder stroke length to accommodate parts of different sizes.

BRIEF SUMMARY OF THE INVENTION

In one aspect of the invention, a TEM machine comprises a frame weldment including a base, a pair of opposing side frame members secured to each other by an upper mounting plate extending between the frame members and the base, and a pair of intermediate mounting plates extending inwardly from the side frame members. A chamber spacer is directly secured to the upper mounting plate. A thermal chamber is directly secured to the chamber spacer. A ram cylinder is directly secured to the base, the ram cylinder having a ram piston with a stroke length, the ram cylinder having a ram piston with a stroke length. A closing plate is directly secured to the rod piston.

In another aspect of the invention, a TEM machine comprises a frame weldment including a base, a pair of opposing side frame members secured to each other by an upper mounting plate extending between the frame members and the base, and a pair of intermediate mounting plates extending inwardly from the side frame members. A thermal chamber is directly secured to the upper mounting plate. At least one ram spacer is directly secured to the base. A ram cylinder is directly secured to the at least one ram spacer, the ram cylinder including a ram piston having a stroke length. A closing plate is directly secured to the ram piston.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DETAILED DESCRIPTION OF THE INVENTION

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims.

Figure 1:
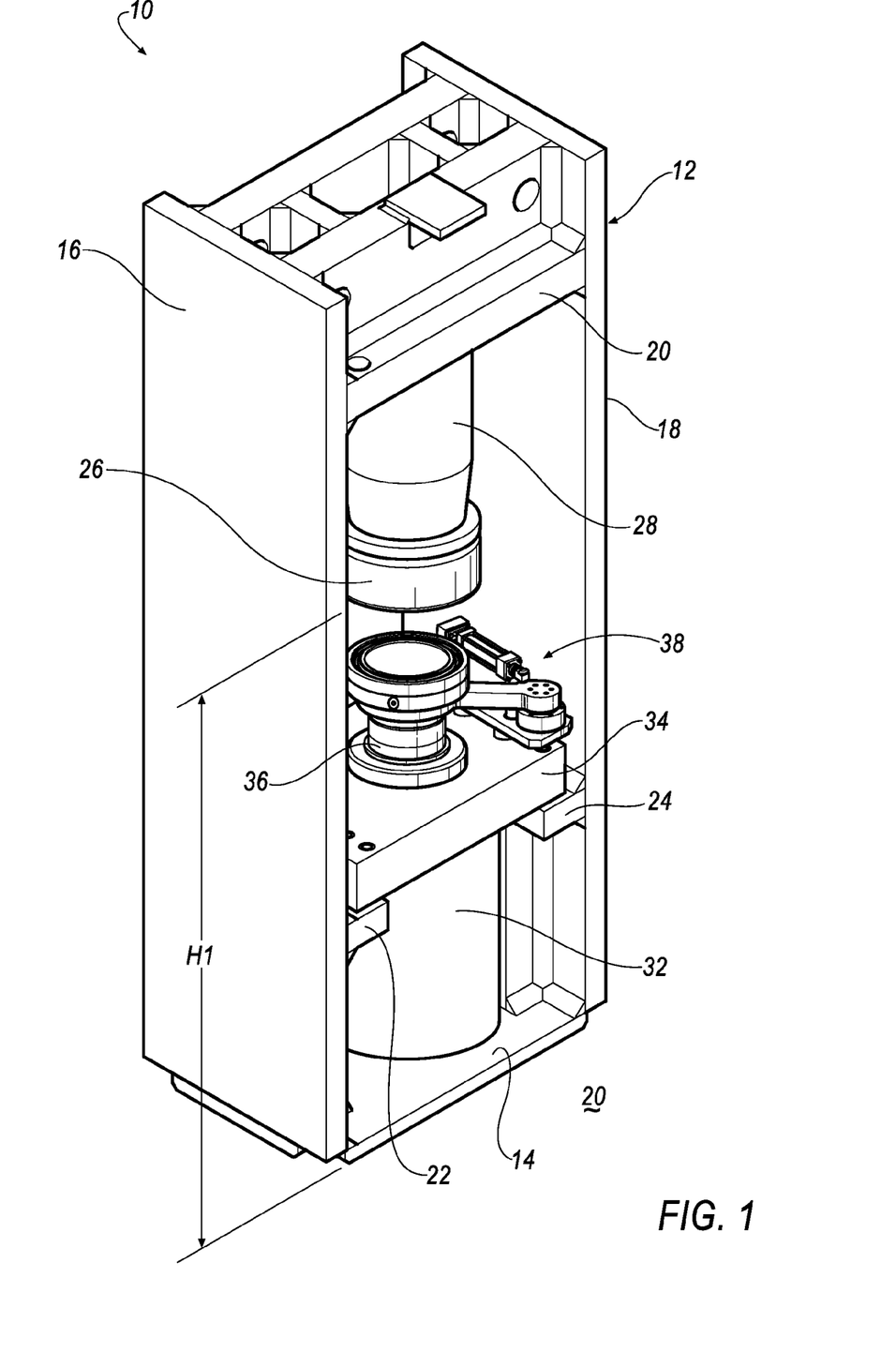
FIG. 1 is a perspective view of a TEM machine for processing short parts according to an embodiment of the invention.
Figure 2:
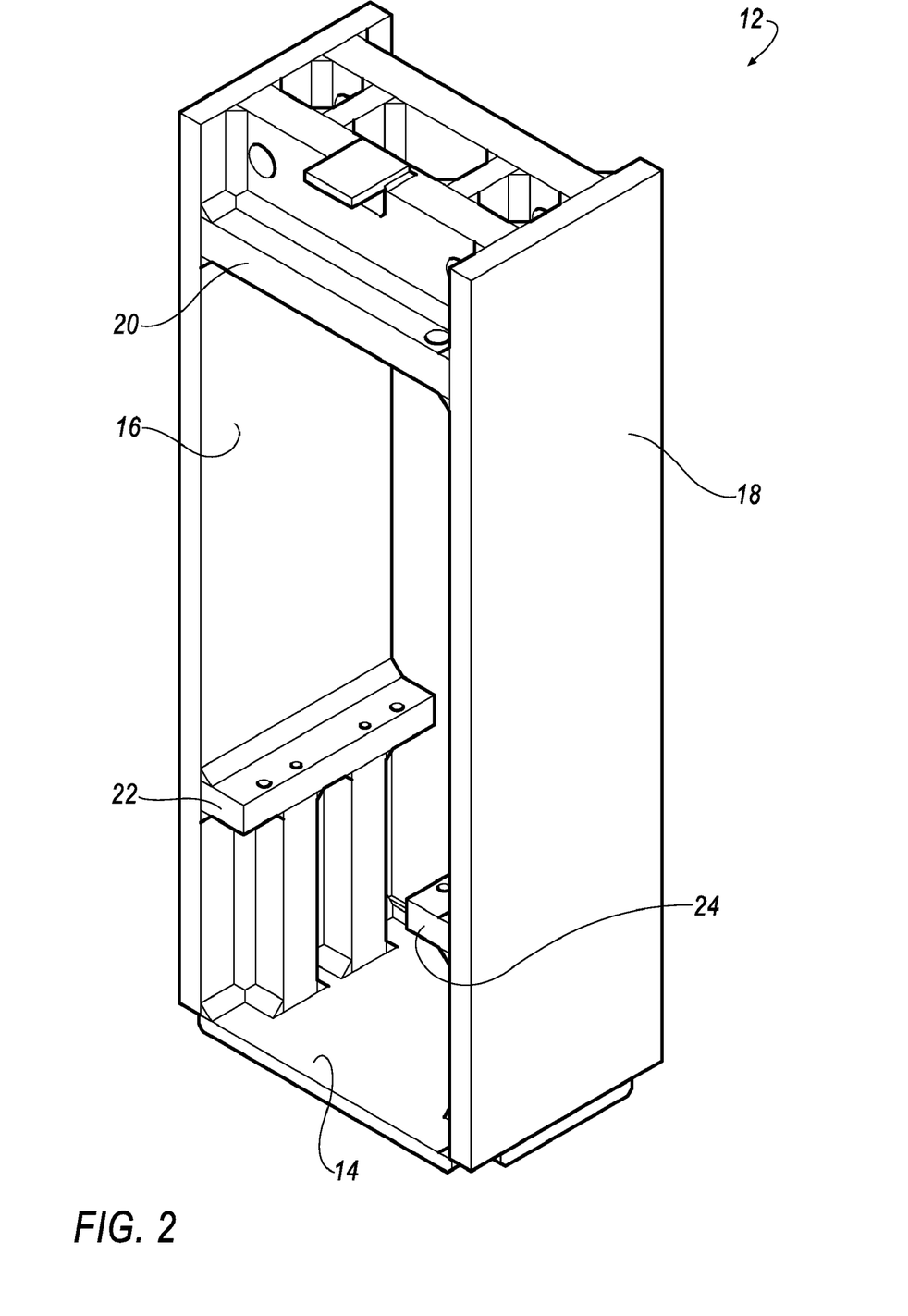
FIG. 2 is a perspective view of a frame weldment of the TEM machine according to an embodiment of the present invention.

Referring now to FIGS. 1 and 2, a thermal energy machining (TEM) machine 10 for processing short parts is shown in an initial position according to an embodiment of the invention. For example, short parts may be on the order of about six (6) inches. The TEM machine 10 includes a stationary frame weldment, shown generally at 12. The frame weldment 12 includes a base 14 and a pair of opposing side frame members 16, 18. The side frame members 16, 18 are secured to each other by an upper mounting plate 20 extending between the frame members 16, 18 and the base 14. The frame weldment 12 also includes a pair of intermediate mounting plates 22, 24 extending inwardly from the side frame members 16, 18, respectively. The TEM machine 10 may also include a hydraulic system (not shown) for providing pressurized fluid to appropriate components of the TEM machine 10. The hydraulic system is of a type well-known in the art.

In one embodiment of the invention, a thermal chamber 26 is rigidly secured to the upper mounting plate 20 by a chamber spacer 28 so that short parts can be processed by the thermal chamber 26. The chamber spacer 28 allows for the thermal chamber 26 to be smaller in volume as compared to a standard-sized chamber. In one embodiment, the thermal chamber 26 has a dimension of about 250 mm×150 mm and operates at a pressure in a range of about 20 bar to about 27 bar. The chamber spacer 28 also positions the thermal chamber 26 closer to the floor 30 as compared to a standard-sized chamber. In the illustrated embodiment, the short part is loaded into the thermal chamber 26 at a height H1 of about 1040 mm from the floor 30 (or base 14).

It will be appreciated that the invention is not limited to the specific chamber dimension and floor height, and that the invention can be practiced with any desirable chamber dimension that is smaller than a standard-sized thermal chamber and any desirable floor height that is less than a standard floor height.

A ram cylinder 32 with a relatively short stroke length is rigidly securely to the base 14 of the frame weldment 12. A closing plate 34 is directly secured to a ram piston 36. The ram piston 36 extends through the closing plate 34 from a load position by the ram cylinder 32 upward vertically to a process position. The thermal chamber 26 is located above and is substantially aligned with the ram piston 36.

Figure 3:
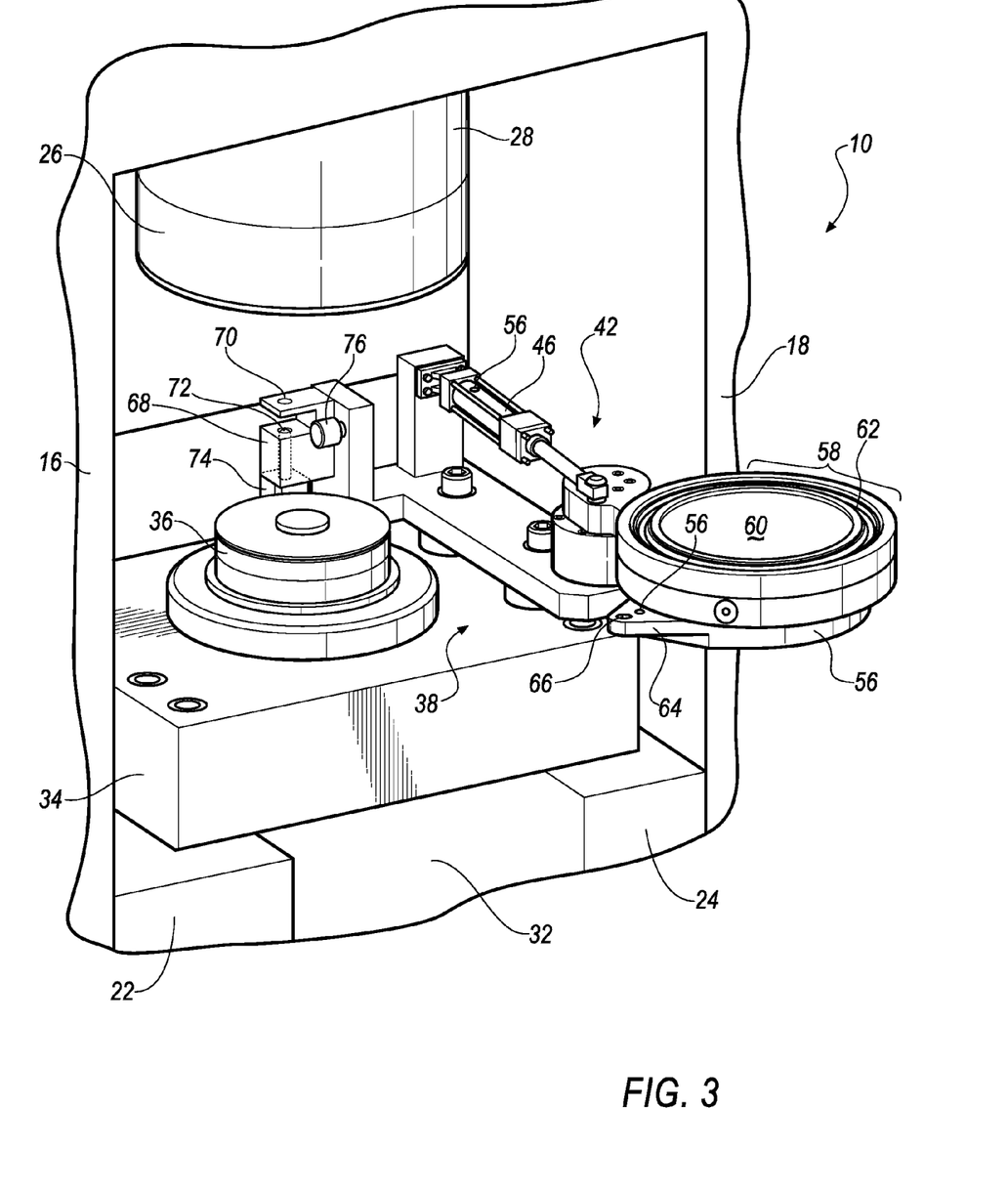
FIG. 3 is a perspective view of the loader assembly as used in a TEM machine when the retractable arm is in an extended position.
Figure 4:
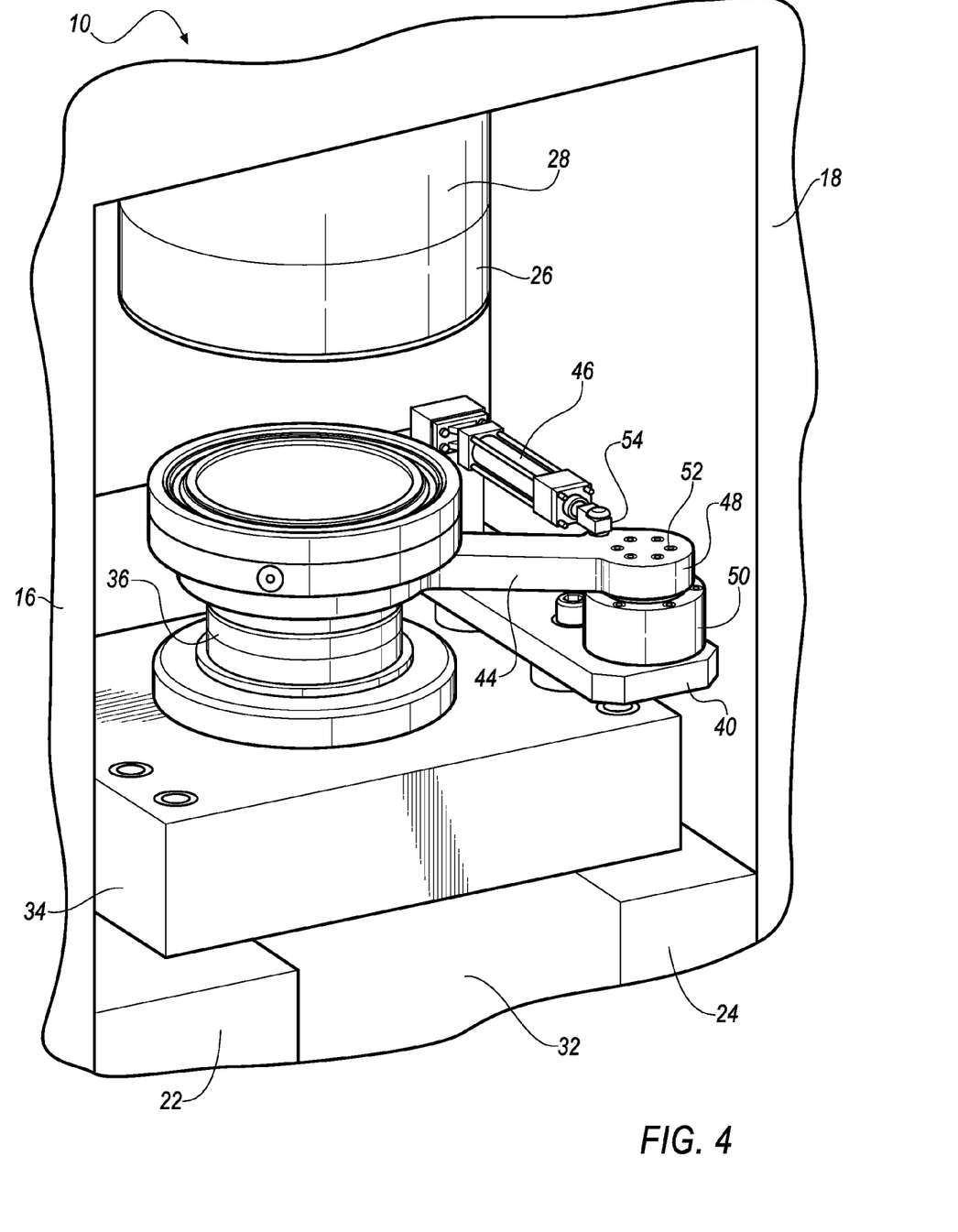
FIG. 4 is a perspective view of the loader assembly when the retractable arm is in a retracted position.
Figure 5:
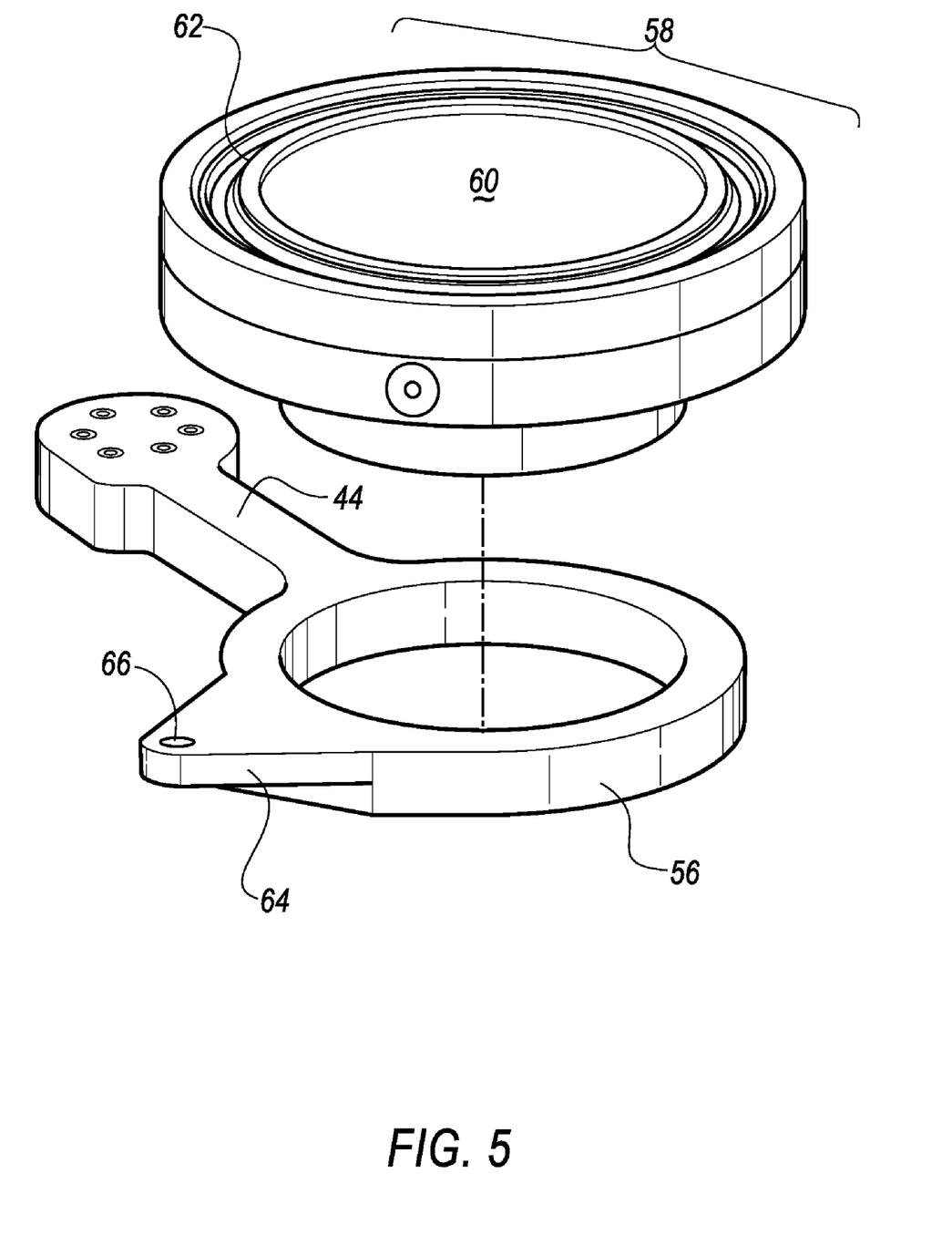
FIG. 5 is an exploded perspective view of the pivot arm and lower closure.

Referring now to FIGS. 3-5, the TEM machine 10 includes a loader assembly, shown generally at 38, having a base 40 upon which the components of the loader assembly 38 are connected. The base 40 is not necessarily required for all embodiments of the invention; however, it provides a way of quickly installing the loader assembly 38 and ensuring alignment of all the components. The loader assembly 38 includes a retractable arm 42 that pivots between an extended position and a retracted position. FIG. 3 shows the retractable arm 42 in the extended position, while FIG. 4 shows the retractable arm 42 in the retracted position.

The retractable arm 42 includes a pivot arm 44 and an actuator 46. The pivot arm 44 pivots about a point which is located on an upper clevis 48 of the pivot arm 44. The upper clevis 48 is rotatably connected to a lower stationary clevis 50. Bearing members 52 are located between the lower stationary clevis 50 and upper clevis 48 to facilitate the rotation. While the pivot arm 44 is described herein as having an upper and lower clevis to facilitate the rotation of the pivot arm 44 between the extended and retracted position, it is within the scope of this invention to have a different type of rotation arrangement. For example, a hinge or shaft with pin can be used to rotate the pivot arm 44 between the extended position and the retracted position.

The actuator 46 is connected to the upper clevis 48 at a connector joint 54. The actuator 46 as shown is a telescopic hydraulic cylinder that extends and retracts and forces the pivot arm 44 to rotate. While the actuator 46 is shown as being hydraulic, it is possible for the actuator to be something other than a hydraulic actuator, for example, a mechanical worm drive, a mechanical lever driven by a motor, or an electromechanical device can be used in the place of an actuator. Essentially the actuator 46 can be any type of device that provides enough force to provide the push/pull type of force required to the pivot arm 44.

The pivot arm 44 also has a hoop portion 56 that moves between the extended and retracted position. The hoop portion 56 is best shown in FIG. 5 and is a frame or ring with an aperture through the center. The hoop portion 56 is configured to receive a lower closure 58. The lower closure 58 has a portion that sets through the aperture of the hoop portion 56. The lower closure 58 is used to hold a part in a part holder area 60. A seal 62 at the lower closure 58 is also present around the part holder area 40, and its function is described below.

The hoop portion 56 has an alignment tab 64 with a pin shaft hole or alignment hole 66. When the retractable arm moves from the extended position to the retracted position, the alignment tab 64 is configured to slide into a shot pin 68 that is connected to the base 40 of the loader assembly 38. The shot pin 68 has an alignment hole 70 that aligns with the alignment hole 66 of the alignment tab 64. A pin 72 contained in a small cylinder 74 extends through the alignment holes 66, 70 when the alignment tab 64 is aligned with the shot pin 68. The extension of the alignment pin 72 holds the retractable arm 42 in place during the TEM process. Additionally, the shot pin 68 also has a stop 76, which can be a metal stop to prevent the hoop portion 56 of the pivot arm 38 from banging against the shot pin 68 during rotation. The stop 76 is an optional component and does not necessarily have to be formed of metal but could also include a softer substance, such as rubber and the like. When the hoop portion 56 of the pivot arm 44 moves from the extended position to the retracted position, the alignment tab 64 moves into position with respect to the shot pin 68.

When the pin 72 from the small cylinder 74 extends through the alignment hole 66 of the alignment tab 64 and the alignment hole 70 of the shot pin 68, the ram piston 36 is aligned with the aperture of the hoop portion 56, lower closure 58, and the thermal chamber 26. At this point, the ram piston 36 is in the load position below the hoop portion 56 and lower closure 58. The ram piston 36 is then moved vertically upward to contact the bottom of the lower closure 58 and raise the lower closure 58 off of the hoop portion 56, with the ram piston 36 extending through the aperture of the hoop portion 56. The ram piston 36 continues to move vertically upward to a load position where the lower closure 58 presents a part located in the part holder area of the thermal chamber 26. The seal 62 on the lower closure aligns with the thermal chamber 26 to form a seal between the thermal chamber 26 and the lower closure 58 so that the part can be processed. At this point, the ram piston 36 is in the process position. Once the TEM process is carried out, the ram piston 36 lowers from the process position back to the load position and the lower closure 58 is set back into position on the hoop portion 56. The pivot arm 44 moves from the retracted position to the extended position where a processed part is then unloaded from the part holder area and a new part to be processed is placed onto the holder area.

As described above, the TEM machine 10 with the thermal chamber 26 with a smaller volume than a standard-sized chamber, and the use of the chamber spacer 28 to position the smaller thermal chamber 26 at the predetermined height Hi above the floor 30 is designed for processing short parts. One aspect of the invention is that the TEM machine 10 can be easily modified to process long parts.

Figure 6:
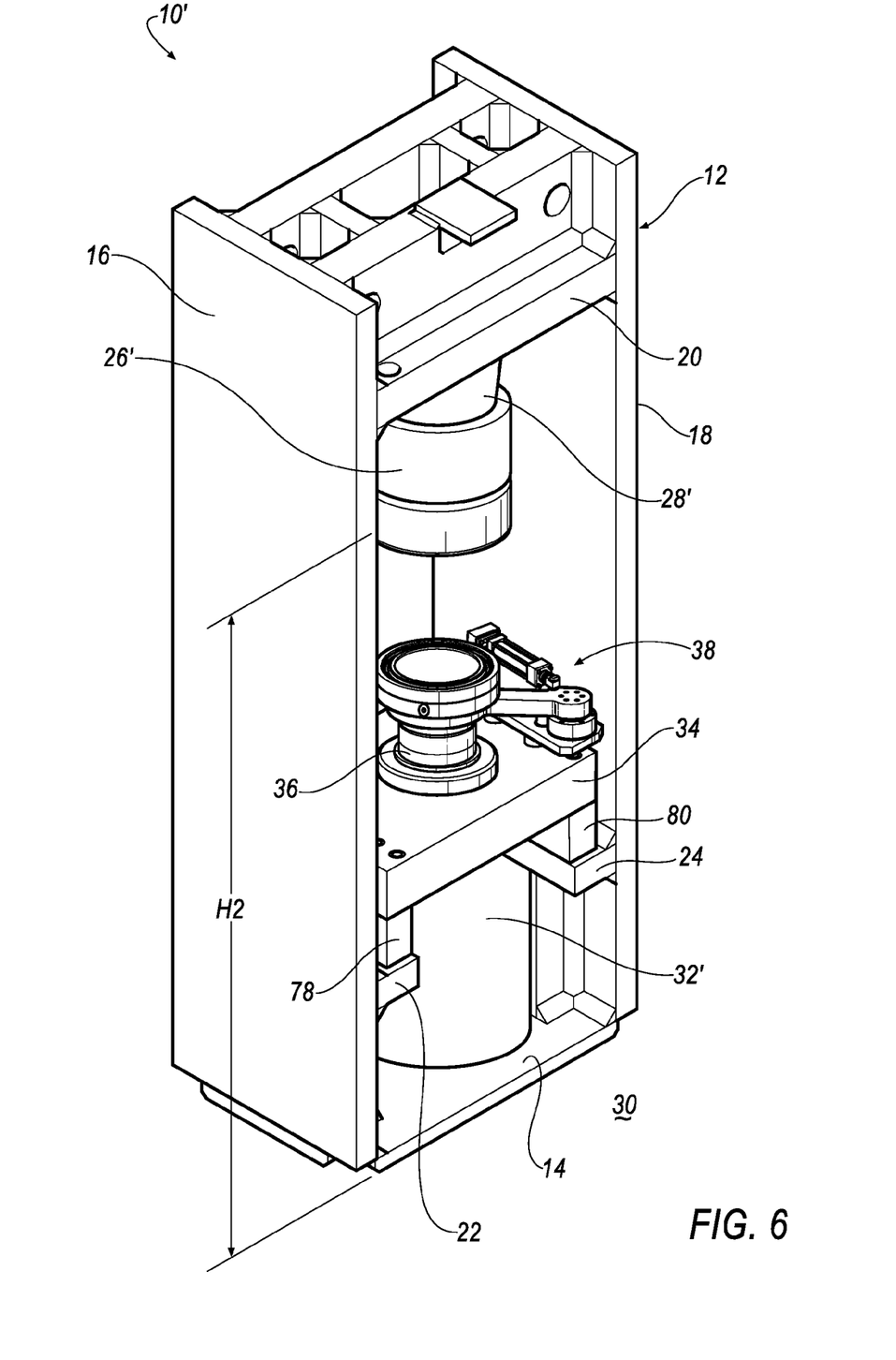
FIG. 6 is a perspective view of a TEM machine for processing long parts according to an embodiment of the invention.

Referring now to FIG. 6, a TEM machine 10' for processing long parts is shown in an initial position according to an alternate embodiment of the invention. For example, long parts may be on the order of twelve (12) inches or more. Many of the components of the TEM machine 10' are identical to the components used in the TEM machine 10 as will not be described here. For example, the frame weldment 12 is identical in both the TEM machine 10' for processing long parts and the TEM machine 10 for processing short parts. The same frame weldment 12 can be used in both machines 10', 10 because the TEM machine 10' for processing long parts includes a thermal chamber 26' with an extended chamber height, a ram cylinder 32' with a long cylinder stroke and at least one ram spacer 78, 80 secured to the base 14 and positioned between the closing plate 34 and the mounting plates 22, 24 of the frame weldment 12.

In this embodiment, the thermal chamber 26' is rigidly secured to the upper mounting plate 20 with a chamber spacer 28' that is shorter in length than the chamber spacer 28 so that long parts can be processed by the thermal chamber 26'. Alternatively, the chamber spacer 28' can be omitted, and the thermal chamber 26' can be directly secured to the upper mounting plate 20. The chamber spacer 28' allows for the thermal chamber 26' having a larger volume as compared to a standard-sized chamber. For example, the thermal chamber 26' has a dimension of about 250 mm×300 mm, roughly twice the volume of the small thermal chamber 26, and operates at a pressure in a range of about 20 bar to about 27 bar. The chamber spacer 28' also positions the thermal chamber 26' further away from the floor 30 as compared to a standard-sized chamber. In the illustrated embodiment, the long part is loaded into the thermal chamber 26' at a height H2 of about 1155 mm from the floor 30 (or base 14).

It will be appreciated that the invention is not limited to the specific chamber dimension and floor height, and that the invention can be practiced with any desirable chamber dimension that is smaller than a standard-sized thermal chamber and any desirable floor height that is less than a standard floor height.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

What is claimed is:

1. A TEM machine for processing short parts, comprising:
a frame weldment including a base, an upper mounting plate, a pair of opposing side frame members secured to each other by the upper mounting plate and the base, and a pair of intermediate mounting plates extending inwardly from the side frame members;
a thermal chamber secured to the upper mounting plate by a chamber spacer;
a ram cylinder secured to the base, the ram cylinder having a ram piston with a stroke length; and
a closing plate directly secured to the ram piston and positioned between the thermal chamber and the pair of intermediate mounting plates.

2. The TEM machine of claim 1, further comprising a loader assembly.

3. The TEM machine of claim 2, wherein the loader assembly comprises:
a retractable arm moveable between a retracted position and an extended position;
a hoop portion of the retractable arm moveable between the retracted position and the extended position;
a lower closure removeably positioned in the hoop portion, wherein the ram piston contacts the lower closure, extends through the hoop portion, and moves the lower closure to the process position when the ram piston moves from the load position to the process position, and
wherein the thermal chamber receives the lower closure when the ram piston moves to the process position.

4. The TEM machine of claim 3, wherein the retractable arm further includes an actuator and a pivot arm connected to the hoop portion and pivots about a point, the actuator is connectable to the pivot arm and provides force to cause the pivot arm to move between the retracted position and the extended position.

5. The TEM machine of claim 4, further comprising a stationary lower clevis, and an upper clevis on the pivot arm, wherein the upper clevis is rotatably connected to the stationary lower clevis.

6. The TEM machine of claim 3, further comprising an alignment tab extending from the hoop portion and having one or more alignment holes; and a shot pin with one or more alignment holes and one or more retractable pins capable of sliding through the one or more alignment holes of the shot pin and the one or more alignment holes of the alignment tab to lock the retractable arm in the retracted position and align the ram piston, hoop portion, lower closure, and thermal chamber.

7. A TEM machine for processing long parts, comprising:
a frame weldment including a base, an upper mounting plate, and a pair of opposing side frame members secured to each other by the upper mounting plate extending between the frame members and the base, and a pair of intermediate mounting plates extending inwardly from the side frame members;

a thermal chamber secured to the upper mounting plate by a chamber spacer;

a ram cylinder directly secured to the at least one ram spacer, the ram cylinder including a ram piston having a stroke length;

a closing plate directly secured to the ram piston; and at least one ram spacer positioned between the closing plate and the pair of intermediate mounting plates.

8. The TEM machine of claim 7, further comprising a loader assembly.

9. The TEM machine of claim 8, wherein the loader assembly comprises:

a retractable arm moveable between a retracted position and an extended position;

a hoop portion of the retractable arm moveable between the retracted position and the extended position;

a lower closure removeably positioned in the hoop portion, wherein the ram piston contacts the lower closure, extends through the hoop portion, and moves the lower closure to the process position when the ram piston moves from the load position to the process position, and wherein the thermal chamber receives the lower closure when the ram piston moves to the process position.

10. The TEM machine of claim 9, wherein the retractable arm further includes an actuator and a pivot arm connected to the hoop portion and pivots about a point, the actuator is connectable to the pivot arm and provides force to cause the pivot arm to move between the retracted position and the extended position.

11. The TEM machine of claim 10, further comprising a stationary lower clevis, and an upper clevis on the pivot arm, wherein the upper clevis is rotatably connected to the stationary lower clevis.

12. The TEM machine of claim 9, further comprising an alignment tab extending from the hoop portion and having one or more alignment holes; and a shot pin with one or more alignment holes and one or more retractable pins capable of sliding through the one or more alignment holes of the shot pin and the one or more alignment holes of the alignment tab to lock the retractable arm in the retracted position and align the ram piston, hoop portion, lower closure, and thermal chamber.

13. A TEM machine for processing short parts, comprising:

a frame weldment including a base, an upper mounting plate, a pair of opposing side frame members secured to each other by the upper mounting plate and the base, and a pair of intermediate mounting plates extending inwardly from the side frame members;

a thermal chamber secured to the upper mounting plate by a chamber spacer;

a ram cylinder secured to the base, the ram cylinder having a ram piston with a stroke length;

a closing plate directly secured to the ram piston and positioned between the thermal chamber and the pair of intermediate mounting plates; and a loader assembly including a retractable arm moveable between a retracted position and an extended position, a hoop portion of the retractable arm moveable between the retracted position and the extended position, and a lower closure removeably positioned in the hoop portion, wherein the ram piston contacts the lower closure, extends through the hoop portion, and moves the lower closure to the process position when the ram piston moves from the load position to the process position, and wherein the thermal chamber receives the lower closure when the ram piston moves to the process position.

14. The TEM machine of claim 13, wherein the retractable arm further includes an actuator and a pivot arm connected to the hoop portion and pivots about a point, the actuator is connectable to the pivot arm and provides force to cause the pivot arm to move between the retracted position and the extended position.

15. The TEM machine of claim 13, further comprising a stationary lower clevis, and an upper clevis on the pivot arm, wherein the upper clevis is rotatably connected to the stationary lower clevis.

16. The TEM machine of claim 13, further comprising an alignment tab extending from the hoop portion and having one or more alignment holes; and a shot pin with one or more alignment holes and one or more retractable pins capable of sliding through the one or more alignment holes of the shot pin and the one or more alignment holes of the alignment tab to lock the retractable arm in the retracted position and align the ram piston, hoop portion, lower closure, and thermal chamber.

17. The TEM machine of claim 13, further comprising at least one ram spacer positioned between the closing plate and the pair of intermediate mounting plates.

\* \* \* \* \*